United States Patent [19]

Brannan

[11] 4,154,429

[45] May 15, 1979

[54] CONTINUOUS WIRE MEANS FOR ELECTRICALLY GROUNDING OR CHARGING INSULATION COATED CHAIN LINK FABRIC

[75] Inventor: Robert R. Brannan, Towson, Md.

[73] Assignee: Anchor Post Products, Inc., Baltimore, Md.

[21] Appl. No.: 791,708

[22] Filed: Apr. 28, 1977

[51] Int. Cl.[2] .................... H05F 3/02; E04H 17/04; B21F 27/08; A01K 3/00

[52] U.S. Cl. .................................... 256/10; 109/35; 174/6; 174/129 R; 245/8; 256/45; 339/98; 361/212; 428/255

[58] Field of Search ............... 174/5 SG, 6, 7, 117 M, 174/129 R, 133 R; 245/1, 2–10; 140/3A, 6, 7, 9, 10, 11; 256/1, 5, 10, 32, 33, 45, 47, 48, 54, 56; 361/1, 212; 109/35; 340/273, 276; 428/255, 256; 339/14 L, 95 R, 96, 98

[56] References Cited

U.S. PATENT DOCUMENTS

| | | | |
|---|---|---|---|
| 3,249,686 | 5/1966 | Paar | 174/129 R X |
| 4,031,284 | 6/1977 | Ingraham | 256/10 X |

*Primary Examiner*—Laramie E. Askin
*Attorney, Agent, or Firm*—Walter G. Finch

[57] ABSTRACT

The invention is an improved method for the electrical grounding of insulation coated chain link fabric that is usually used for fences or similar enclosures. The invention provides a continuous wire at the top or bottom, or both, edges of the erected fabric that electrically connects each of the insulation coated wires which make up the fabric. The continuous wire is then grounded at intervals along the length of the fence or enclosure and thus effectively electrically grounds the fabric. Numerous variations in the configuration of the wire are included in the embodiments for accomplishing the grounding.

9 Claims, 10 Drawing Figures

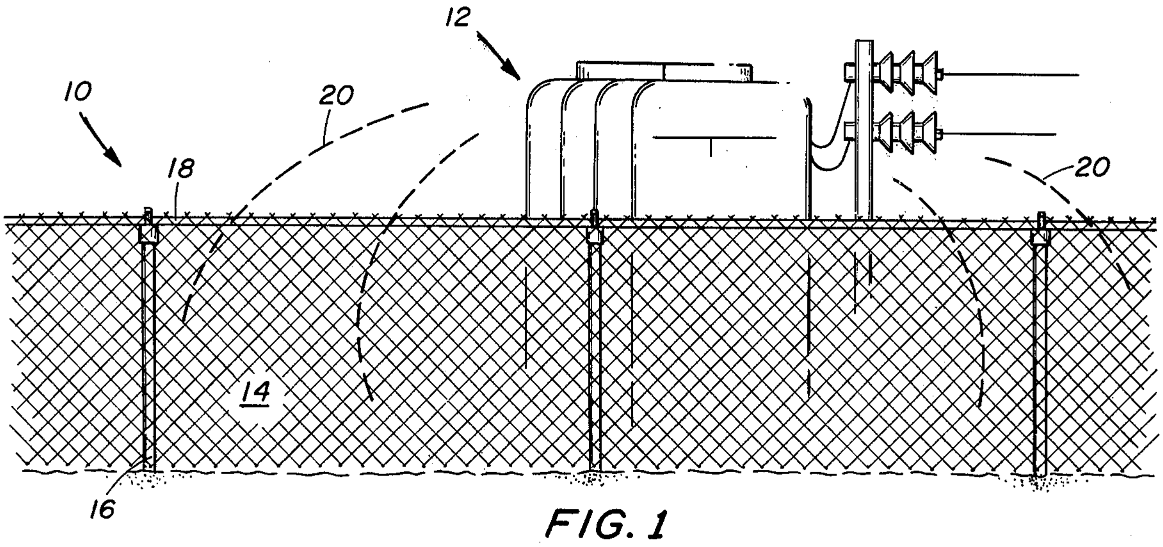
FIG. 1
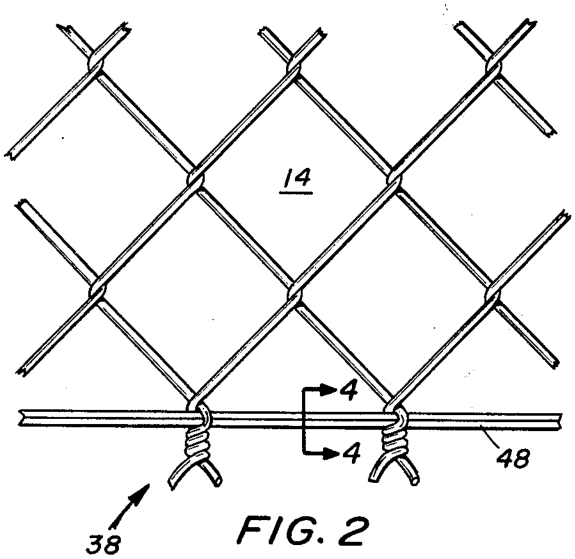
FIG. 2
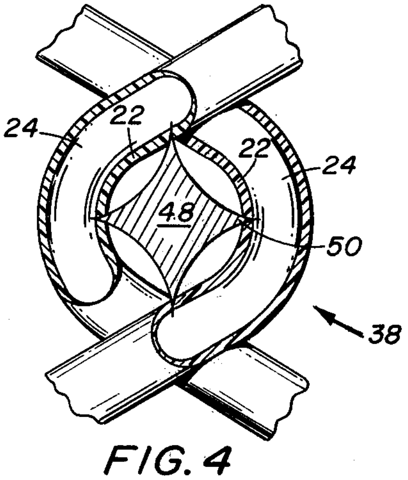
FIG. 4
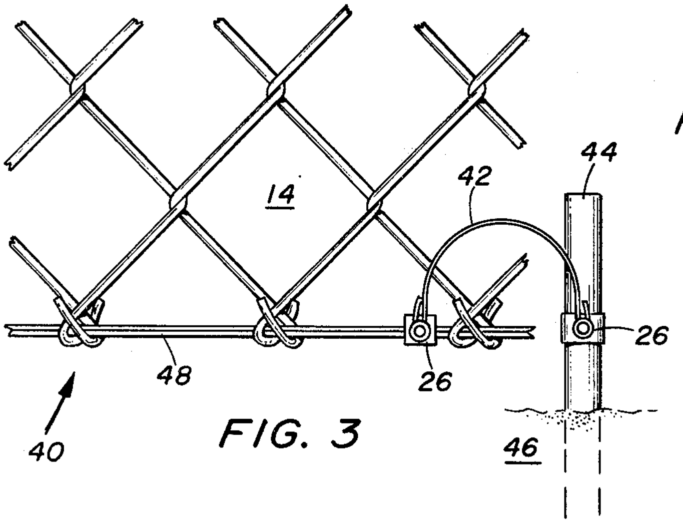
FIG. 3
FIG. 5
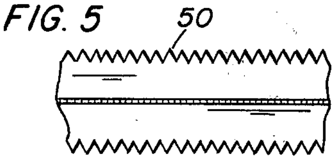
FIG. 6
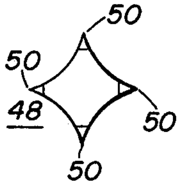
FIG. 7
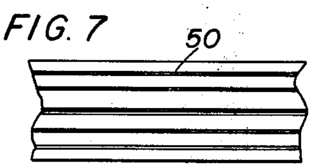
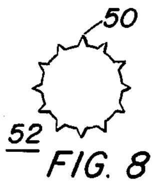
FIG. 8
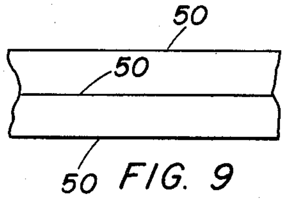
FIG. 9
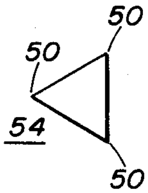
FIG. 10

CONTINUOUS WIRE MEANS FOR ELECTRICALLY GROUNDING OR CHARGING INSULATION COATED CHAIN LINK FABRIC

BACKGROUND AND SUMMARY OF THE INVENTION

The invention relates to methods for the electrical grounding of plastics coated chain link fabric, usually used for fences or similar enclosures, but not limited to such applications.

There is a need in the various industries using plastics coated chain link fabric, for fences or other applications, to be able to electrically ground the said fabric.

It should be noted that when the term "plastics coated" is used concerning this invention that an insulating material in intended and the use of other insulating materials other than plastics is included within the scope and intent of this invention.

The need for such electrical grounding is for the purpose of eliminating induced voltages, static charges, and other currents which might occur in such a chain link fabric installation.

Certain installations of chain link fabric, such as in fencing, especially those which are installed near transformer, generating and other electrical equipment, are subject to induced voltages.

Previously, galvanized chain link fences or fences without insulating coatings would be grounded at intervals along the length of the fence, so that these voltages and currents would be eliminated by grounding through known clamps and known grounding systems.

Chain link fabric is formed in a chain-like system where flattened helixes are woven to flattened helixes. When the wire from which the fabric is woven is insulated, there is no grounding from one helix to the next helix.

It should be understood that the use of the term plastics coated is intended to mean any form of insulation where plastics or other material is used. Such other insulating materials are within the scope and intent of this invention.

Once the individual wires in said helix form that comprise the fabric are grounded or inter-connected to the next helix, and thence throughout the fabric until the entire fabric is inter-connected or grounded together, any charge on the fabric is taken to ground by known means. The fabric is effectively electrically grounded along its entire length at periodic intervals.

When a chain link fabric is woven to various heights for use as fencing, the various heights are obtained by adding "diamonds" (the diamond pattern of the woven fabric).

Standard heights in the industry are normally woven by weaving a specified number of "diamonds" for the desired height. These heights are not woven with an even number of "diamonds", they are woven with a half of a "diamond" in the height. Having the fabric thus woven, the top of one helix connects to the bottom of its adjacent helix and thereon along the length of the fabric.

With the above pattern of weaving the wires are connected, one to the other, at the "twist" or "knuckle" at the top and then a similar connection at the bottom to an adjacent wire. Thus alternating top and bottom the connection moves down the length of the fabric.

By the use of the inter-connecting or grounding method in this invention through the above weaving method, a continuous flow of current can be obtained down the entire length of the fabric segment. Such a continuous flow can draw off or drain off all induced voltages, static charges, and other electrical currents in the fabric. Thus, taken to ground, the fabric, whether as a fence or in any other use, is effectively, electrically grounded.

The conductive wire of this invention runs along either the top of a structure of chain link fabric or the bottom (or could be run at both top and bottom if desired). It can be a conductive wire or strip. This wire or strip interconnects with each of the vertical helixes, because of its shape or configuration and the fact that pressure is applied at each one of these connecting points as the conductive wire is fastened in place.

The conductive wire, as will be hereinafter described, is enclosed within the twist edge or the looped or knuckle edge of the chain link fabric. This is done by including the insertion during the weaving procedure. After the conductive wire is woven into the twist or into the loops or knuckle, a pressure-type device further adds pressure. The pressure-type device acts somewhat like a hammer and anvil combination and makes sure that the insulating material on the wire is cut, pierced, punctured, or penetrated so that there is a metal to metal contact in order to make a connection for electrical conducting purposes.

It is therefore an object of the invention to provide an effective electrical grounding system for plastics or otherwise insulated chain link fabric when used as fencing or for other similar enclosures.

Another object of this invention is to establish said effective electrical grounding by use of a continuous wire system to simplify the manufacturing procedure.

It is another object of the invention to incorporate in said single wire a means for design that, in addition to grounding the said chain link fabric, it discourages intruders over or under the enclosure.

It is a further object of the invention to provide a variety of single wire means to accomplish said effective electrical grounding.

Further objects and advantages of the invention will become more apparent in light of the following description of the preferred embodiments.

BRIEF DESCRIPTION OF THE DRAWINGS

FIG. 1 is a pictorial view showing a typical electrical installation enclosed by a chain link fabric structure made of plastics coated or otherwise insulated wire;

FIG. 2 is a partial view of the chain link fabric showing the continuous wire grounding means installed on the typical twisted wire ends;

FIG. 3 is a partial view of the chain link fabric showing the continuous wire grounding means installed on the typical looped wire ends;

FIG. 4 is a cross sectional view taken in the direction of line 4—4 of FIG. 2;

FIG. 5 is a plan view of a first embodiment of a continuous wire means for grounding;

FIG. 6 is an end view of FIG. 5;

FIG. 7 is a plan view of a second embodiment of a continuous wire means for grounding;

FIG. 8 is an end view of FIG. 7;

FIG. 9 is a plan view of a third embodiment of a continuous wire means for grounding;

FIG. 10 is an end view of FIG. 9.

DESCRIPTION OF THE PREFERRED EMBODIMENTS

Referring now to the drawings an particularly to FIG. 1, a typical chain link fabric structure 10 is shown, in this case a fence enclosure surrounding a typical electrical installation 12.

A chain link fabric 14 is shown mounted on typical posts 16 with a typical top rail 18.

Shown pictorally in schematic form is a typical electrical field 20 from the typical electrical installation 12 that creates the induced charge, static charge, or other stray electrical currents on the insulated chain link fabric 14. It is these charges or currents that are taken to ground by this invention.

Turning now to FIGS. 2 and 3, of the drawings, the chain link fabric 14 is shown in both FIGS. 2 and 3.

In FIG. 2 the ends of the fabric 14 are shown as twisted ends 38, twisted around a continuous wire grounding means 48 of this invention.

In FIG. 3 the ends of the fabric 14 are shown as looped or knuckle ends 40, looped around the continuous wire grounding means 48 of this invention.

In a typical chain link fabric structure 14 the ends of the wire elements of the structure are usually twisted as at 38 along one edge and looped or knuckled as at 40 along the other edge, unless the design provides for twisting along both edges.

Referring now to FIG. 4, one of the embodiments of the continuous wire grounding means 48 is shown using one of the variations of the grounding means 48. The variation shown is the square-type 48 having barbs 50 which cut, pierce, or penetrate the plastics coating or other insulation material 22 on the metal wire 24 from which the chain link fabric 14 is made. This cutting, piercing, or penetrating action takes place as the twisted wire ends 38 are twisted tightly around the continuous wire grounding means 48 during manufacture of the fabric 14 during the weaving procedure. The square type 48 is also shown in plan view in FIG. 5 and end view in FIG. 6.

As the barbs 50 cut, pierce, penetrate or puncture the insulating material 22 on the metal wire 24, the metal barbs make contact with the metal wire 24 and provide a path for continuous flow of an electrical current or charge between all elements of the structure.

When the continuous wire grounding means 48 in the fabric 14 is erected, as say a typical fence enclosure 10, the barbs 50 on the continuous wire grounding means 48 serve as a deterrent to discourage intruders over or under the enclosure where the continuous wire grounding means 48 is located.

Other variations of the continuous wire grounding means 48 are shown in FIGS. 7 and 8 as the round-type 52 with similar barbs 50, and in FIGS. 9 and 10 as the triangular-type 54 with similar barbs 50. It should be noted that the sharp edges or points may be of a barb-like configuration or a knife-edge like configuration.

It should be noted that FIGS. 5 and 6, 7 and 8, and 9 and 10 show three variations for the continuous wire grounding means 48, 52 and 54 respectively. This does not preclude other configurations, such as five-point star shape, a barbed strip, or a deformed strip, that provides barbs or sharp edges 50 along the continuous length (such as 48, 52, or 54), and such variations are within the scope and intent of this invention.

Once all of the individual wires 24 (insulated 22) of the chain link fabric 14 are in continuous electrical contact through the barbs 50 of the continuous wire grounding means 48, 52, or 54, the chain link fabric 14, as part of a typical enclosure 10, is ready to have any charges or currents associated with the structure collected and conducted to the ground to discharge the structure.

The grounding means to discharge any current or charge on the fabric is shown in FIG. 3. A clip 26 is attached to the continuous wire grounding means. A wire 42 from clip 26 is connected to a ground stake 44 by another clip 26. Thus the current or charge on the chain link fabric 14 is conducted from the continuous wire grounding means 48 (52, or 54), through first clip 26, wire 42, second clip 26, through ground stake 44 to the earth ground 46 for discharge. Such grounding means are located at intervals along the length of the fabric structure 10.

Thus, the chain link fabric 14 of a typical structure 10 is effectively electrically grounded or discharged by this invention.

If desired, the chain link fabric structure 10 can be maintained in a electrified condition by omitting the final ground connection by wire 42 through ground stake 44 to earth 46 and connecting the chain link fabric structure to the desired source of electrical energy. Thus, such a modified structure can be used for security purposes.

Accordingly, modifications and variations which the invention is susceptible to may be practiced without departing from the scope of the appended claims.

What is claimed is:

1. An electrically interconnected chain link fabric structure and grounding means therefor, comprising:

a chain link fabric formed of a plurality of individual helix type wires each composed of a metallic core covered with electrical insulating material, adjacent wires being interengaged at points along their lengths and being coupled together at their ends;

a continuous conductive wire connection means electrically and serially connecting all of the individual wires of said chain link fabric to form a continuous conductive wire system, said continuous conductive wire connection means being an elongated metal member having a plurality of peripherally spaced, longitudinally extending barbs formed integrally therewith, each barb being substantially coextensive in length with said metal member and defining an elongate knife edge, said metal member being specifically located for contacting the metallic cores of said individual wires of said chain link fabric, said plurality of barbs penetrating said insulating material of said individual wires of said chain link fabric and making metal to metal contact with the metallic cores of said individual wires of said chain link fabric; and a grounding means electrically connected to said continuous conductive wire system for discharging said continuous conductive wire system.

2. The combination as recited in claim 1, wherein said elongated metal member is a metal wire.

3. The combination as recited in claim 1, wherein said elongated metal member is a metal strip.

4. The combination as recited in claim 1, wherein the couplings at the ends of adjacent helix wires are formed by twisting together the ends of adjacent helix wires, and wherein said continuous conductive wire connection means is specifically located to be enclosed within each of said twisted ends.

5. The combination as recited in claim 1, wherein the couplings at the ends of adjacent helix wires are looped knuckle connections joining adjacent helix wires, and wherein said continuous conductive wire connection means is specifically located to be enclosed within each of said looped knuckle connections.

6. The combination as recited in claim 1, wherein each said barb is formed with serrations along its length.

7. The combination as recited in claim 1, and further including a plurality of spaced, upright supports, said chain link fabric structure being stretched between said supports and fastened thereto so as to constitute a fence, and said grounding means comprises at least one ground connection electrically connected to said continuous conductive wire system at a point along the length of said chain link fabric and terminating in the earth to ground the entire fence.

8. An electrically interconnected chain link fabric structure and charging means therefor, comprising:

a chain link fabric formed of a plurality of individual helix type wires each composed of a metallic core covered with electrical insulating material, adjacent wires being interengaged at points along their lengths and being coupled together at their ends;

a continuous conductive wire connection means electrically and serially connecting all of the individual wires of said chain link fabric to form a continuous conductive wire system, said continuous conductive wire connection means being an elongated metal member having a plurality of peripherally spaced, longitudinally extending barbs formed integrally therewith, each barb being substantially coextensive in length with said metal member and defining an elongate knife edge, said metal member specifically located for contacting the metallic cores of said individual wires of said chain link fabric, said plurality of barbs penetrating said insulating material of said individual wires of said chain link fabric and making metal to metal contact with the metallic cores of said individual wires of said chain link fabric; and means connected to said continuous conductive wire system for charging said continuous conductive wire system, said means for charging being located near said chain link fabric structure and being electrically connected thereto by a conductive wire.

9. The combination as recited in claim 8, and further including a plurality of spaced, upright supports, said chain link fabric structure being stretched between said supports and fastened thereto so as to constitute a fence; said fence, when charged by said charging means, serving as a security fence.

* * * * *